United States Patent
McDonough et al.

(10) Patent No.: US 7,474,688 B2
(45) Date of Patent: Jan. 6, 2009

(54) SYSTEM AND METHOD FOR DETECTING MULTIPLE DIRECT SEQUENCE SPREAD SPECTRUM SIGNALS USING A MULTI-MODE SEARCHER

(75) Inventors: John G. McDonough, La Jolla, CA (US); Gibong Jeong, San Diego, CA (US); Karim Abdulla, San Diego, CA (US); Rajiv R. Nambiar, San Diego, CA (US)

(73) Assignee: Texas Instruments Incorporated, Dallas, TX (US)

( * ) Notice: Subject to any disclaimer, the term of this patent is extended or adjusted under 35 U.S.C. 154(b) by 632 days.

(21) Appl. No.: 10/651,282

(22) Filed: Aug. 28, 2003

(65) Prior Publication Data
US 2004/0062299 A1    Apr. 1, 2004

Related U.S. Application Data

(60) Provisional application No. 60/415,211, filed on Oct. 1, 2002.

(51) Int. Cl.
*H04B 1/00* (2006.01)
(52) U.S. Cl. .................. 375/147; 375/130; 375/136; 375/137; 375/141; 375/142; 375/143; 375/144; 375/148; 375/149; 375/150

(58) Field of Classification Search .............. 375/130, 375/136–137, 141–144, 147–150
See application file for complete search history.

(56) References Cited

U.S. PATENT DOCUMENTS

| | | | | |
|---|---|---|---|---|
| 5,987,016 A | * | 11/1999 | He | 370/335 |
| 6,661,833 B1 | * | 12/2003 | Black et al. | 375/147 |
| 6,937,643 B2 | * | 8/2005 | Li et al. | 375/147 |
| 7,099,679 B2 | * | 8/2006 | Rainish et al. | 455/506 |
| 2003/0086396 A1 | * | 5/2003 | Gurski et al. | 370/335 |
| 2003/0128747 A1 | * | 7/2003 | Poon et al. | 375/148 |

* cited by examiner

*Primary Examiner*—Curtis B Odom
(74) *Attorney, Agent, or Firm*—Ronald O. Neerings; Wade James Brady, III; Frederick J. Telecky, Jr.

(57) ABSTRACT

System and method for detecting multiple direct sequence spread spectrum signals using a multi-mode searcher. A preferred embodiment comprises the specification of a hypothesis for a particular communications network. The hypothesis can then be used to generate a pseudo-random number (PN) sequence that is provided to a searcher. The searcher can then make adjustments to the PN sequence to bring the PN sequence to conformity with requirements of the particular communications network. The adjustment to the PN sequence permits the use of a multi-mode searcher to perform searches for signals of various communications networks with minimal hardware dedicated to each communications network.

31 Claims, 4 Drawing Sheets

SYSTEM AND METHOD FOR DETECTING MULTIPLE DIRECT SEQUENCE SPREAD SPECTRUM SIGNALS USING A MULTI-MODE SEARCHER

This application claims the benefit of U.S. Provisional Application No. 60/415,211, filed on Oct. 1, 2002, entitled "Method and Apparatus for Detecting UMTS and IS-2000 Direct Sequence Spread Spectrum Signals Using a Multi-Mode Searcher," which application is hereby incorporated herein by reference.

CROSS-REFERENCE TO RELATED APPLICATIONS

This application is related to the following co-pending and commonly assigned patent applications: Ser. No. 10/651,120, filed Aug. 28, 2003, entitled "System and Method for Detecting Direct Sequence Spread Spectrum Signals Using Pipelined Vector Processing"; Ser. No. 10/659,905, filed Sep. 11, 2003, entitled "System and Method for Detecting Direct Sequence Spread Spectrum Signals Using Batch Processing of Independent Parameters"; Ser. No. 10/439,400, filed May 16, 2003 entitled "System and Method for Intelligent Processing of Results from Search of Direct Sequence Spread Spectrum (DSSS) Signals"; Ser. No. 10/650,427, filed Aug. 28, 2003, entitled "System and Method for Performing Symbol Boundary-Aligned Search of Direct Sequence Spread Spectrum Signals", which applications are hereby incorporated herein by reference.

TECHNICAL FIELD

The present invention relates generally to a system and method for digital wireless communications, and more particularly to a system and method for detecting multiple direct sequence spread spectrum signals using a multi-mode searcher.

BACKGROUND

In the interest of interoperability of wireless communications equipment and devices, there has been a considerable amount of effort expended between various global standards bodies to establish a single direct sequence (DS) code-division multiple access (CDMA) communications system that may be used throughout the world. Unfortunately, despite all of the work, there has been seen an emergence of two dominant standards for frequency division duplex (FDD) single carrier CDMA for use in third generation networks, named CDMA2000 (also referred to as IS-2000) and UMTS WCDMA (Universal Mobile Telephony System Wideband-CDMA, commonly referred to as UMTS).

While these two technical standards are both based upon CDMA, they are basically incompatible. This means that a CDMA2000 wireless device will not operate in a UMTS network and vice versa. Therefore, to support interoperability, a wireless device needs to be able to operate in the two incompatible networks.

One commonly used prior art technique to enable multi-network operation is to include needed hardware and software to permit operation in multiple networks. This may require the presence of multiple iterations of certain hardware components within a single wireless device. The repeated hardware and software components may range from analog signal processing components if the operating frequencies of the networks are different to specific digital components such as correlators and so forth if differences in the networks are relatively smaller and lie mainly in the encoding of the transmitted signals.

For example, CDMA2000 and UMTS networks are both based upon CDMA. However, the two standards differ in many respects, including but not limited to chip-rate (1.2288 MHz vs. 3.84 MHz), frame length, scrambling code (augmented PN codes vs. Gold codes), transmit diversity (OTD or STS vs. STTD), and separation of base-station codes (phase offsets vs. unique Gold codes). For detailed explanation of the differences between CDMA2000 and UMTS, refer to technical documentation for the two standards. The differences between CDMA2000 and UMTS (some of which are listed above) may require different designs for various hardware and software components, especially the searcher units, which are used in the synchronization of the wireless devices to the network equipment (namely, base stations). Network synchronization is an especially critical for proper operation in CDMA2000 and UMTS, since a wireless device is required to become synchronized with the wireless communications network in order to communicate.

One disadvantage of the prior art is that the inclusion of multiple iterations of hardware and software components to support operation in multiple networks may consume more resources, such as memory and integrated circuit real-estate. This can result in a larger and more expensive wireless device.

A second disadvantage of the prior art is that the use of multiple hardware components in a single wireless device can increase power consumption, resulting in shorter battery life or requiring the use of more expensive batteries and/or battery technology.

A third disadvantage of the prior art is that the presence of multiple hardware and software components in a single wireless device may help to reduce the reliability of the wireless device. The reduced reliability may come as a result of the greater amount of hardware, hence more devices that may fail. Alternatively, the reduced reliability may be the result of the greater amount of software, increasing the probability of an undiscovered bug being present in the software.

SUMMARY OF THE INVENTION

These and other problems are generally solved or circumvented, and technical advantages are generally achieved, by preferred embodiments of the present invention which provides a system and a method for detecting multiple direct sequence spread spectrum signals by using a multi-mode searcher unit.

In accordance with a preferred embodiment of the present invention, a method for detecting direct sequence spread spectrum signals with a searcher comprising specifying a hypothesis for a direct sequence spread spectrum signal from a specific communications network, generating a pseudo-random number (PN) sequence based on the hypothesis, providing the PN sequence to the searcher to correlate with a received signal, adjusting the PN sequence to conform to the specific communications network, and correlating the adjusted PN sequence with a received signal.

In accordance with another preferred embodiment of the present invention, a circuit comprising a memory to store information relevant to a hypothesis, sequence generator coupled to the memory, the sequence generator containing circuitry to generate a pseudo-random number (PN) sequence based on the hypothesis, a searcher coupled to the sequence generator, the searcher containing circuitry to correlate the PN sequence generated by the sequence generator with a received signal and to accumulate results from the correlation, and a search controller coupled to the memory, the search controller containing circuitry to configure and control the operation of the searcher.

In accordance with another preferred embodiment of the present invention, a wireless receiver comprising an analog front end coupled to an antenna, the analog front end containing circuitry to filter and amplify a received signal provided by the antenna, an analog-to-digital converter (ADC), the ADC to convert an analog signal provided by the analog front end into a digital symbol stream, and a digital signal processing section coupled to the ADC, the digital signal processing section containing circuitry to synchronize the wireless receiver with a communications network.

An advantage of a preferred embodiment of the present invention is minimum hardware and software repetition is used, hence the resulting wireless device that is capable of operating in multiple wireless communications networks will offer minimum complexity over a wireless device that does not.

A further advantage of a preferred embodiment of the present invention is that the minimized additional hardware will result in a small increase in power consumption, hence will not significantly impact the talk time and standby type of the wireless device.

Yet another advantage of a preferred embodiment of the present invention is that by minimizing additional hardware and software, the overall reliability of the wireless device will be minimally impacted.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to preferred embodiments in a specific context, namely a wireless receiver that is capable of being used in both a CDMA2000 and an UMTS wireless communications network. An overview of the CDMA2000 technical standard is provided in a document entitled "Introduction to CDMA2000 Spread Spectrum Systems, Release 0," which is herein incorporated by reference. An overview of the UMTS technical standard is provided in a document entitled "$3^{rd}$ Generation Partnership Project; Technical Specifications Group Services and System Aspects General UMTS Architecture (Release 4)," which is herein incorporated by reference. The invention may also be applied, however, to other wireless receivers wherein there is a desire to use the wireless receivers in multiple communications networks with minimized hardware repetition and replication to permit the wireless receivers the capability to be used in each of the communications networks.

Figure 1:
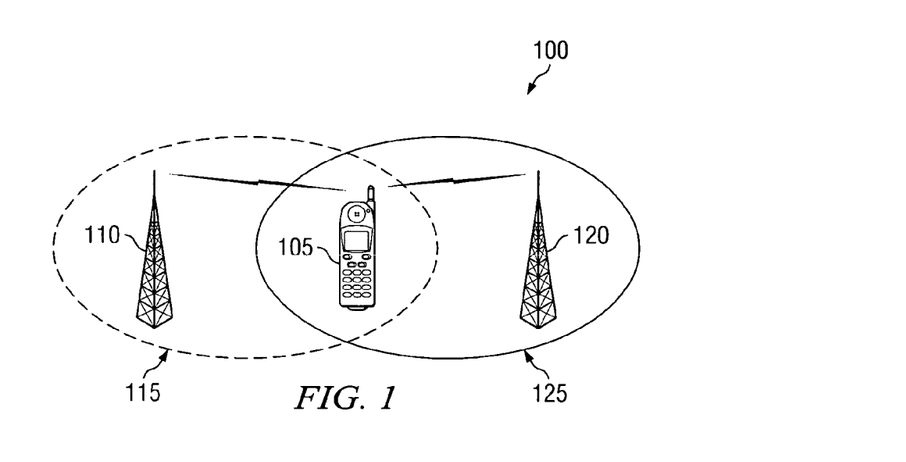
FIG. 1 is a diagram of an exemplary usage scenario for a wireless device.

With reference now to FIG. 1, there is shown a diagram illustrating an exemplary usage scenario 100 for a wireless device 105. The wireless device 105 is shown communicating with two different base stations 110 and 120, wherein the two base stations may be a part of different wireless communications networks using possibly different communications technologies. The wireless device 105, when within an effective coverage area of either of the two base stations 110 (coverage area 110) and 120 (coverage area 125), can become linked with the respective base station and hence a part of the wireless communications network. Note that although the base stations 110 and 120 are displayed as being in relatively close proximity, it may be possible that the base stations 110 and 120 are widely separated, perhaps cities (or states, countries, or continents) apart. It is the intent of FIG. 1 to display that the wireless device 105 may be capable of communicating with either base station 110 and/or 120 when it is in the base station's coverage area.

Figure 2:
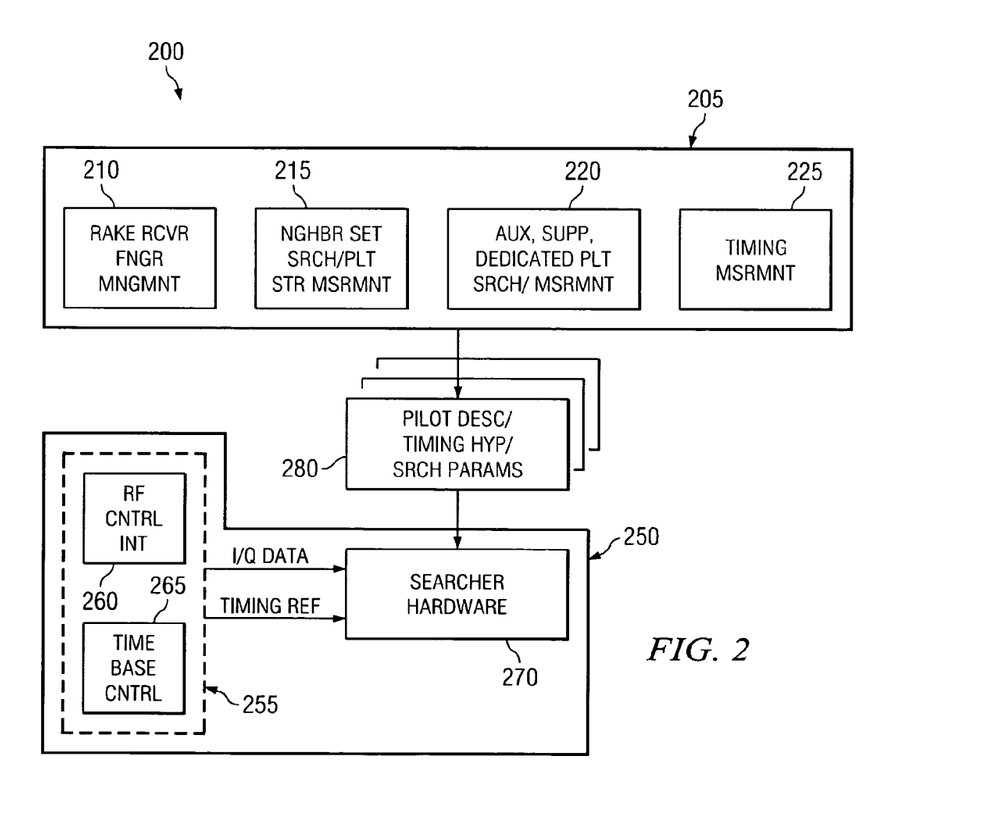
FIG. 2 is a diagram of a functional view of hardware and software used to perform synchronization for a wireless device.

With reference now to FIG. 2, there is shown a diagram illustrating a functional view of hardware and software used to perform system synchronization for a wireless device 200. System synchronization in a wireless device 200 can be performed by a combination of software (a software portion 205) and hardware (a hardware portion 250) components and an interface 280. The software portion 205 may include software and firmware applications that may execute on a microprocessor, a digital signal processor (DSP), a micro-controller, or a custom integrated circuit (ASIC) or a combination thereof to control the hardware components in the hardware portion 250. The interface 280 may be thought of as a way for the software (and firmware) applications in the software portion 205 to provide control information and data to the hardware portion 250. For example, the interface 280 may be a memory or a set of registers, accessible by both the software portion 205 and the hardware portion 250, and can be used to store the control information and data.

The software portion 205 may be grouped into several software objects, based on functionality. Examples of the software objects can include: a rake receiver management object 210, which may be used to configure and control the operation of a rake receiver to help maximize received signal strength; a neighbor set search and pilot strength measurements object 215, which may be used to search and measure pilot channels of neighboring base stations; an auxiliary supplemental, dedicated pilot channel search and measurement object 220, which may be used to perform pilot channel searches and measurements; and a timing measurement object 225, which may be used to use timing information derived from pilot channels to determine the location of the wireless device. These software objects (and others) make use of hardware in the hardware portion 250 to perform their tasks.

The hardware portion 250 may be grouped into two distinct components, a radio frequency (RF) receive component 255 and a searcher 270. The RF receive component 255 may include a RF control interface 260 and a time base controller 265 and can be used to control RF hardware used to receive the signal transmitted over-the-air to the wireless device. The RF receive component 255 may then provide the received signal to the searcher 270, preferably in the form of two sequences (an I and a Q sequence) along with a timing reference signal. The searcher 270 may then perform the necessary processing of the received signal to support the requirements of the software objects. Examples of the processing performed by the searcher 270 may include correlating the received signal with locally generated signal sequences, despreading the received signal, coherent and non-coherent accumulation, and so forth.

Figure 3:
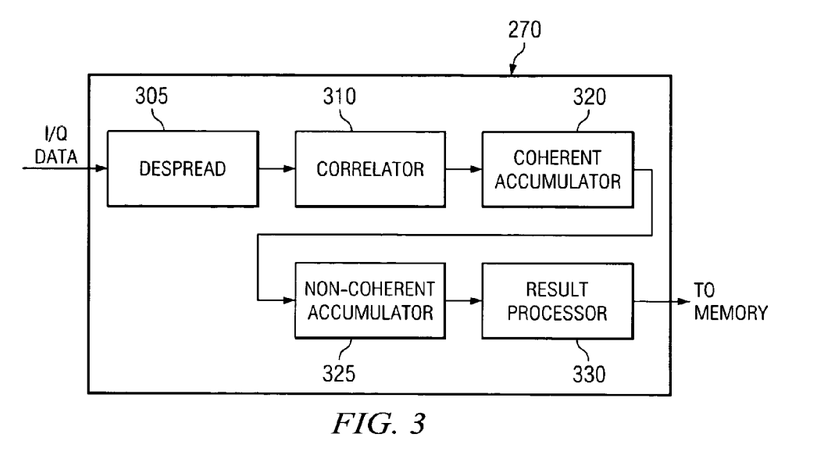
FIG. 3 is a detailed view of a generic searcher.

With reference now to FIG. 3, there is shown a diagram illustrating a detailed view of a searcher 270. As discussed above, a primary function of a searcher is to perform a correlation of a received signal against a locally stored copy of the received signal adjusted at various specified offsets and to produce accumulations (both coherent and non-coherent) based on the correlation results. The specified offsets in the locally stored copy of the received signal (along with other information, such as window size) are commonly referred to as a hypothesis.

The received signal (normally in the form of two streams, an I and a Q) is provided to the searcher 270 from a RF section (perhaps from the time base controller 265 (FIG. 2)) of the wireless device, along with some timing information which may have been derived from the received signal. The received signal may then be provided to a despreader 305 which can be used to remove a spreading code applied to the signal prior to its transmission. Additionally, any antenna diversity encoding scheme can also be removed by the despreader 305. After despreading, the received signal may be correlated with a locally stored version of the received signal adjusted with a specified offset. For example, in a CDMA2000 system, base stations transmit a specific pseudo-random number (PN) sequence at differing offsets. This is referred to as the base station's pilot channels. While in a UMTS system, the base stations may all transmit the same PN sequence at different offsets, the transmissions are further scrambled by each base station's unique scrambling code. Copies of the PN sequences (without scrambling or offsets) transmitted by the base stations may be stored in the wireless devices for use in the correlator.

After correlation, the correlation results may be provided to a coherent accumulator 320 and a non-coherent accumulator 325. The coherent accumulator 320 accumulates the results of the correlation of the received signal and the locally stored copy of the received signal set at a specified offset (and perhaps with a scrambling code) while the non-coherent accumulator performs its accumulation without regard to the phase component of the correlation. The accumulation results may then be provided to a results processor 330 which can parse through the correlation results to determine the correlations which result in accumulations exceeding a specified threshold. The hypothesis (with its offset (and scrambling code if in a UMTS system)) associated with the correlation that resulted in the largest accumulation may then be used to help the the wireless device become synchronized with the base station using the same offset.

In order for a wireless device (such as the wireless device 105 (FIG. 1)) to be able to communicate with base stations from different wireless communications networks, wherein the wireless communications networks may be using different communications protocols or different technologies, the wireless device 105 may need to have all necessary hardware required for operation in each wireless communications network. For example, in order for a wireless device 105 to be able to communicate in both a CDMA2000 compliant communications network and an UMTS compliant communications network, the wireless device 105 may need sufficient hardware to essentially make the wireless device 105 both a CDMA2000 wireless device and an UMTS wireless device, all in a single unit.

Figure 4:
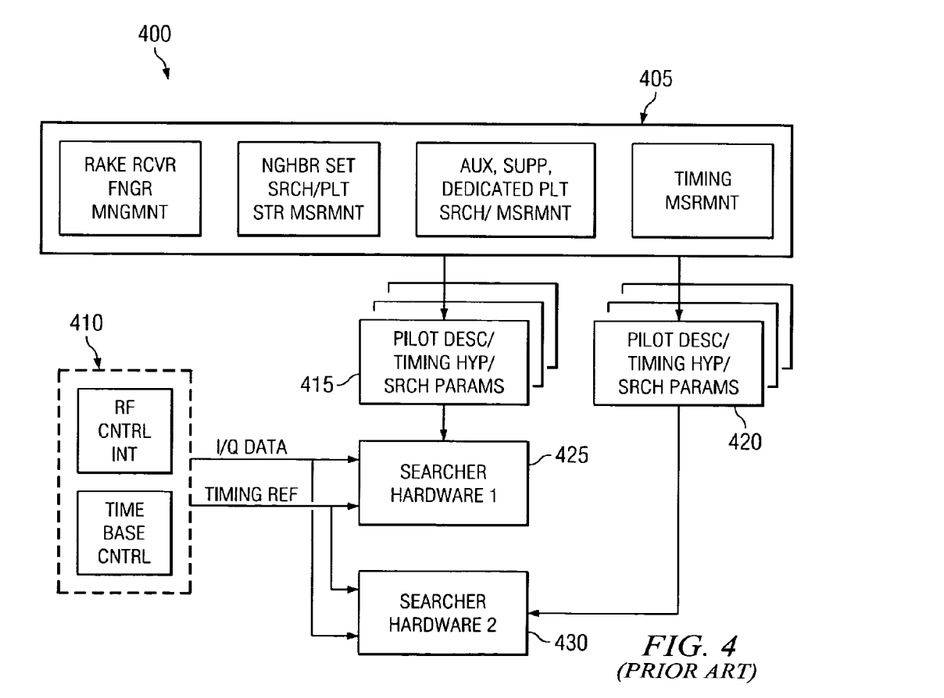
FIG. 4 is a detailed view of hardware and software used to perform synchronization for a prior art wireless device with multiple searchers.

With reference now to FIG. 4, there is shown a diagram illustrating a view of hardware and software used to perform system synchronization for a prior art wireless device 400, wherein multiple searchers are present to provide search capabilities in different communications networks. The wireless device 400 may have essentially the same software portion 405 and RF receive component 410 as does the wireless device 200 (FIG. 2). However, instead of a single searcher 270 (FIG. 2), the wireless device 400 can have multiple searchers (two are shown in FIG. 4, a first searcher 425 and a second searcher 430, although more than two may be used). The first and second searchers 425 and 430 may be coupled to the RF receive component 410 wherein they can receive the received signal and a timing reference signal.

Operating as an interface between the searchers 425 and 430 and the software portion 405 of the wireless device 400 may be multiple memories (two memories are shown in FIG. 4, a first memory 415 and a second memory 420). Again, more than two memories may be present in the wireless device 400. Additionally, rather than memories, sets of registers may be present to serve as interfaces. Alternatively, a single memory with several sections dedicated to each of the searchers may be used. The memories 415 and 420 can hold hypotheses to be tested by the searchers 425 and 430. According to a preferred embodiment of the present invention, the searchers 425 and 430 may be individually configured to perform hypothesis testing according to a particular type of communications network. For example, the searcher 425 may be configured to perform hypothesis testing only for UMTS networks, while the searcher 430 may operate only with hypotheses for CDMA2000 networks.

Then, depending on the type of hypothesis (either UMTS or CDMA2000), the software portion 405 may write the hypothesis to either of the two memories 415 or 420. The hypothesis may then be used to generate a PN sequence that can be used to correlate against the received signal. Note that there may be more than two searchers present. For example, to help improve performance, there may be more than one searcher dedicated to correlating UMTS hypotheses and more than one searcher dedicated to correlating CDMA2000 hypotheses. Additionally, the number of searchers dedicated to UMTS hypotheses may be different from the number of searchers dedicated to CDMA2000 hypotheses.

In addition to having separate searcher hardware, the wireless device 400 may have additional hardware that may have to be dedicated to the correlation of the different hypotheses. For example, sequence generators (not shown in FIG. 4) which are used to generate the PN sequences to be correlated against the received signals may be dedicated to UMTS and CDMA2000 searchers. In addition to dedicated hardware, software may need to be specifically dedicated to working with either UMTS or CDMA2000 hypotheses.

Figures 5, 6:
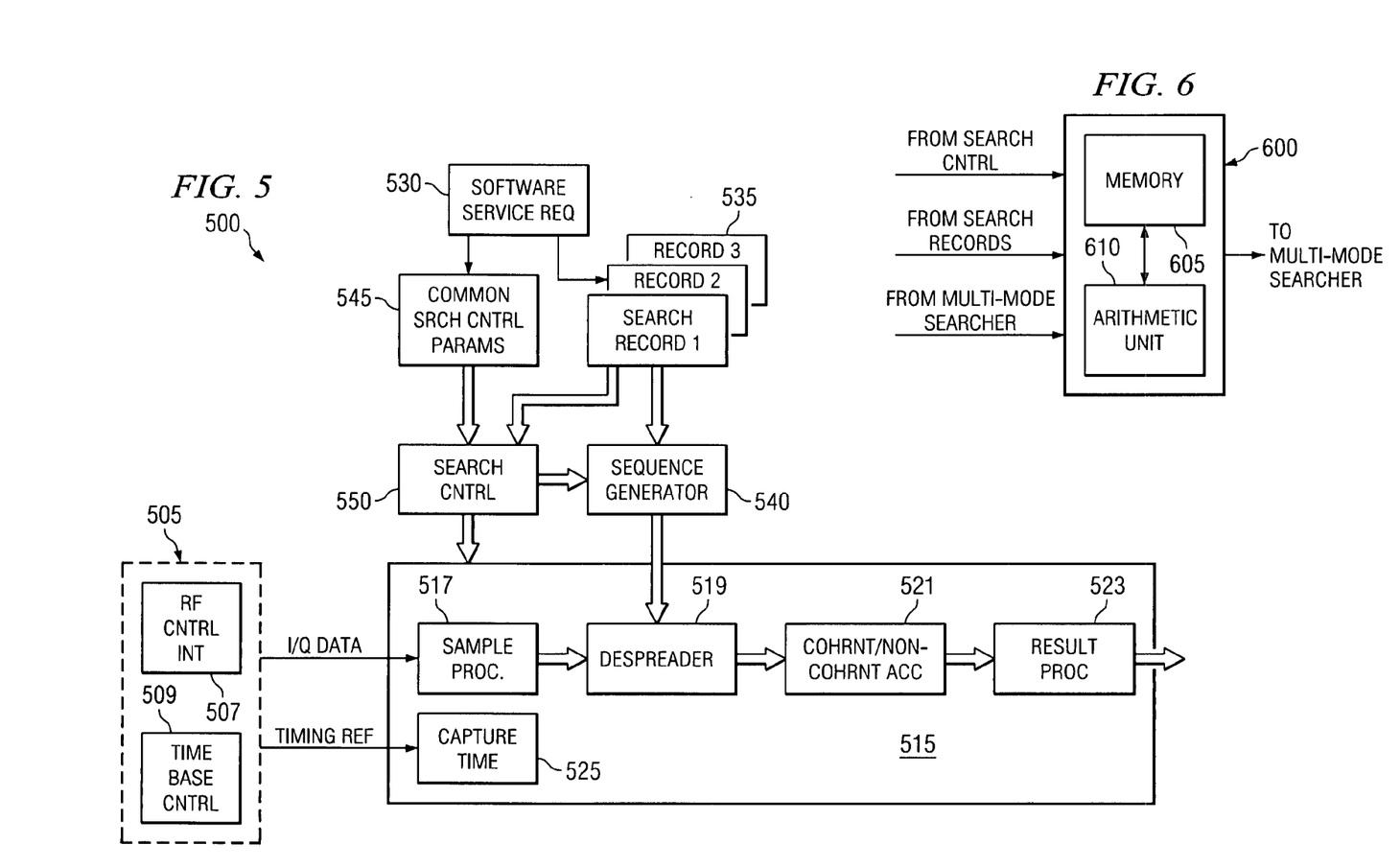
FIG. 5 is a diagram of a portion of a wireless device with a multi-mode searcher capable of correlating both UMTS and CDMA2000 hypotheses with minimum dedicated hardware or software, according to a preferred embodiment of the present invention.
FIG. 6 is a diagram of a pseudo-random number sequence generator, according to a preferred embodiment of the present invention.

With reference now to FIG. 5, there is shown a diagram illustrating a portion of a wireless device 500 with a multi-mode searcher 515 that can correlate both UMTS and CDMA2000 hypotheses with minimum dedicated hardware or software, according to a preferred embodiment of the present invention. Similar to the wireless device 400 (FIG. 4), the wireless device 500 can have an RF receive component 505 which includes an RF control interface 507 and a time base controller 509. The RF receive component 505 may be used to provide the received signal, along with a timing reference signal, to the multi-mode searcher 515. The multi-mode searcher 515 essentially performs the typical searcher functions, such as correlation, coherent accumulation and non-coherent accumulation, and processing of the correlation results.

The multi-mode searcher 515 may include: a sample processor 517, which can be used to create samples of the received signal streams (I and Q); a despreader 519, which can be used to reverse any antenna diversity scheme applied to the transmitted signal at the time of transmission; a coherent/non-coherent accumulator 521, which can be used to accumulate correlations of the received signal with generated PN sequences, both with (coherent accumulation) and without (non-coherent accumulation) consideration of the phase of the signal; a results processor 523, which can be used to analyze the accumulation results to determine if a good match has been made between a generated PN sequence and the received signal; and a capture time unit 525, which can be used to provide reference timing information to be used in the generation of the PN sequences. For a more detailed description of the operation of a result processor, please refer to a co-pending and co-assigned patent application entitled "Method and System for Intelligent Processing of Results from Search of Direct Sequence Spread Spectrum (DSSS) Signals", filed "May 16, 2003", Ser. No. "10/439,400", which is herein incorporated by reference.

Operating to control the hardware in the multi-mode searcher 515, provide search information (in the form of hypotheses and other information related to the search), use the results of the search, among other functions, is a software portion (not shown) of the wireless device 500. The software portion of the wireless device 500 may perform many of the functions of the software portion 405 (FIG. 4) and hence, may appear similar.

In addition to displaying the RF receive component 505 and the multi-mode searcher 515, FIG. 5 displays a flow of information involved in the use of the multi-mode searcher 515 to test a hypothesis that may be one of several different types (i.e., UMTS or CDMA2000). When a program executing in the wireless device 500 (perhaps an "acquire system" program or a "search for neighbors" program, designed to find pilot channels and base stations) wishes to test a hypothesis (regardless of type), it may issue a service request (block 530) to an application that is responsible for controlling the operation of the multi-mode searcher 515.

The service request 530, as issued by the program executing in the wireless device 500, may result in the programming of search records (for example, search record 1 through search record 3 (blocks 535)), with information regarding the search. According to a preferred embodiment of the present invention, the programming of a search record for a specific search by a service request 530 may be indexed by a number to permit easy reference to the search itself. For example, a service request 530 may program search record number 2, then in the future, all references to that particular search can be based on the number 2. Note that FIG. 5 displays three search records in block 535. However, there can be an arbitrary number of search records with a limit being the amount of memory dedicated to storing search records and any design considerations placed by the designers of the wireless device 500.

The information programmed into the search records 535 may include but not limited to information about the scrambling code (such as the PN code timing offset or the Gold code number), Walsh/OVSF spreading code information to enable a search of auxiliary or supplemental pilot channels, and transmit diversity details, and so on. Therefore, depending upon the intended communications network of the search being specified, the information provided to the search record 535 can be different.

In addition to programming the search records 535, the service request 530 may provide some search parameters (displayed in block 545) for use in control of the search being specified. According to a preferred embodiment of the present invention, the search parameters 545 can be provided to a search control unit 550, which may be used to control the operation of the multi-mode searcher 515. The search parameters 545 may also be indexed by the same reference number used to index the search records 535, hence permitting the dynamic modification of the search control based on the programming provided by the service request 530.

A sequence generator 540, used to generate PN sequences for use in the correlations performed by the multi-mode searcher 515, can make use of the search records 535 and control information provided by the search control unit 550 to generate the requested PN sequences. The sequence generator 540 can use timing information provided by the capture time unit 525 and search information programmed by the service request 530 (indexed by a reference number) to provide a PN sequence used to correlate the received signal. Note that specific differences in the PN sequences being generated by the sequence generator 540 depending on the requirements of the different communications networks (such as the pilot channel code being 32768 chips in length for CDMA2000 while for UMTS, the Gold code is 38400 chips in length) can be dealt with in the multi-mode searcher 515. For example, the multi-mode searcher 515 may have an adder that can automatically perform an arithmetic operation to a PN sequence wrap-around for the CDMA2000 pilot channel code since it is shorter in length than the gold code used in UMTS. Alternatively, the sequence generator 540 may be used to provide the necessary adjustments in the differences between the PN sequences for the various communications networks.

In order to support both UMTS and CDMA2000, the sequence generator 540 may need to generate several different types of PN sequences. For example, in UMTS, the sequence generator 540 would need to generate PN sequences referred to as Gold Codes while for CDMA2000, the PN sequences used are known as maximal length codes (or m-codes). Gold Codes and m-codes are considered well understood by those of ordinary skill in the art of the present invention.

A traditional method used for the generation of Gold Codes involves the use of two linear feedback shift registers (LFSR) of nominal 18 bit length, with each having different polynomials and initial states. Then, for a Gold Code of index N (an integer value), one of the two LFSRs is shifted by N while the other remains unshifted. This provides an offset of N between the two LFSRs. Each LFSR then outputs a single bit that is the result of an XOR (exclusive-OR) operation of the 18 bits in the LFSR. The single bit from each LFSR is then XOR'ed together to produce a single Gold Code PN bit of index N. Using this technique, any arbitrary Gold Code PN bit can be obtained by shifting both LFSRs by the same amount.

According to a preferred embodiment of the present invention, Gold Code PN sequences may also be generated using matrix multiplication techniques. By writing each of the two 18-bit LFSRs in its Fibonacci form, the output bit of the LFSR is simply the least significant bit (LSB) of the LFSR state (as opposed to the XORing the 18 state bits together). An advantage in using the Fibonacci form of the LFSRs is that the next output bit is the LSB of the LFSR after a single bit shift. This may be due to the fact that the only bit which may change value on a single shift is the most significant bit (MSB). Other bits simply transition down the chain towards the LSB. Since it is preferred that the sequence generator 540 provide a length 16 PN sequence, the entire 16 value PN sequence can be available at one time.

To further reduce the number of computational and storage requirements of the sequence generator 540, a property of LFSR state values is that any given LFSR state that can be expressed as a sum of two or more other states can be obtained via the multiplication of these two or more states. For example, should it be desired to generate an LFSR state for state 299, this can be accomplished via the multiplication of states 256, 32, 8, 2 and 1. Therefore, any state of the 18-bit LFSR can be created via a maximum of 17 multiplications. However, since the UMTS technical standard specifies a possible range of states from zero (0) to 38399, only the constant values for 16 states may be needed to be stored. Then, to generate a Gold Code PN sequence, the sequence generator 540 may need the following information: the Gold Code index (i.e., N) and the number of times that the two LFSRs are shifted.

The generation of OVSF/Walsh PN sequences is more straight-forward. Since according to the CDMA2000 technical standard, a wireless station is only required to synchronize to a Primary Common Pilot Channel (P-CPICH) which is always assigned OVSF/Walsh "0" over a Spreading Factor of 256. Therefore, a typical way to generate an OVSF/Walsh "0" PN sequence with a Spreading Factor of 256 would be to simply store a 256×256 Hadamard matrix in tabular form. However, to save storage space, the sequence generator 540 can store a 16×16 Hadamard matrix in tabular form. This is due to a property of Hadamard matrices which states that larger Hadamard matrices can be constructed from smaller Hadamard matrices. The use of a Hadamard matrix to generate OVSF/Walsh PN sequences is considered well understood by those of ordinary skill in the art of the present invention. Then, to generate an OVSF/Walsh PN sequence, the sequence generator 540 may need the following information: Spreading Factor (although in CDMA2000, it is fixed at 256), OVSF/Walsh index (varies from 0 to 511), and PN index. Note that the stored 16×16 Hadamard matrix can be used to generate any OVSF/Walsh sequence of length 512, not just OVSF/Walsh "0". Therefore, a relatively small amount of storage space can be spent for a significant amount of flexibility.

With reference now to FIG. 6, there is shown a diagram illustrating a sequence generator 600, according to a preferred embodiment of the present invention. According to a preferred embodiment of the present invention, the sequence generator 600 may be used in place of the sequence generator 540 displayed in FIG. 5. From the discussion above on the generation of PN sequences can be both computationally intensive and demanding on memory storage. However, by using the simplification techniques discussed, both the computation and storage demands can be reduced.

The sequence generator 600 can include a memory 605, which may contain read-only memory (ROM) for use in storing data such as the Hadamard matrix used in the generation of the OVSF/Walsh PN sequences for use in CDMA2000 searches and the states for the two LFSRs for use in the generation of Gold codes for use in UMTS searches. In addition to containing ROM, the memory 605 may contain some random access memory (RAM) that can be used for temporary storage of the PN sequences as they are being generated or as scratch-pad memory to store intermediate values and the like. The memory 605 may be coupled to an arithmetic unit 610 that can be used to perform the necessary computations. The sequence generator 600 may receive data and/or information from a search control unit (such as the search control unit 550 (FIG. 5)), a search record specifying the specifics requirements of a search (such as the search records 535 (FIG. 5)), and a multi-mode searcher (such as the multi-mode searcher 515 (FIG. 5)). Additionally, the sequence generator 600 may also provide the generated PN sequence to the multi-mode searcher 515 for use in its correlations with a received signal.

Figure 7A:
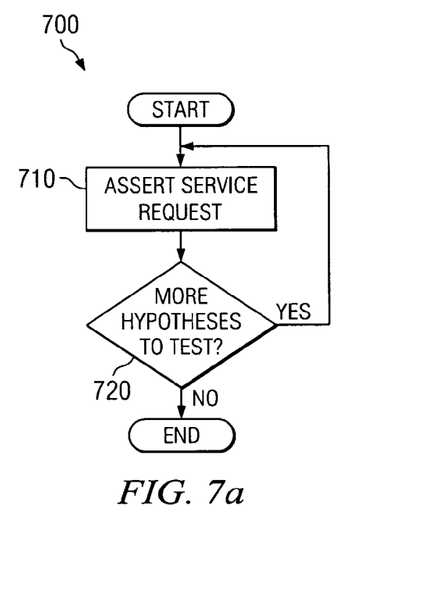
FIGS. 7a and 7b are diagrams illustrating an algorithm used by a wireless device to request the generation of a pseudo-random number sequence and a sequence of steps undertaken by a sequence generator to generate a requested pseudo-random number sequence, according to a preferred embodiment of the present invention.

With reference now to FIG. 7a, there is shown a flow diagram illustrating an algorithm 700 that can be used by a wireless device to request the generation of a PN sequence, according to a preferred embodiment of the present invention. According to a preferred embodiment of the present invention, the algorithm 700 may be a program executing in a processor in the wireless device. Alternatively, the algorithm 700 may execute on a digital signal processor (DSP), a microcontroller, or a custom integrated circuit (ASIC) in the wireless device.

When the wireless device has a hypothesis to test, regardless of type (for example, either UMTS or CDMA2000), the wireless device may assert a service request (block 710). When the service request has been asserted, the wireless device can then check to see if there are more hypotheses to test (block 720), then the wireless device may return to block 710 to assert more service requests. If there are no more hypotheses to test, then the algorithm 700 is complete and the wireless device can return to normal operations.

When the wireless device asserts a service request, it may write the hypothesis and any information relevant to the hypothesis, such as scrambling code, Walsh/OVSF spreading code information, transmit diversity details, and so on, to a memory. Then, when a different program responds to service the service request, data related to the hypothesis will be readily available. Alternatively, the wireless device may write the information relevant to the hypothesis in a memory and in the service request, the wireless device may simply provide an index to the location in the memory and the program servicing the service request can use the index to reference the information.

The program servicing the service request can then take the information regarding the hypothesis and place the information into a search record. Additionally, if the wireless device provided any parameters for search control, the program can place the parameters in a search control unit (such as the search control unit 545 (FIG. 5)). According to a preferred embodiment of the present invention, the program servicing the service requests can be executed each time that there is an outstanding service request. For example, if there are 15 outstanding service requests, then the program that services the service requests can be executed 15 times, once per outstanding service request.

Figure 7B:
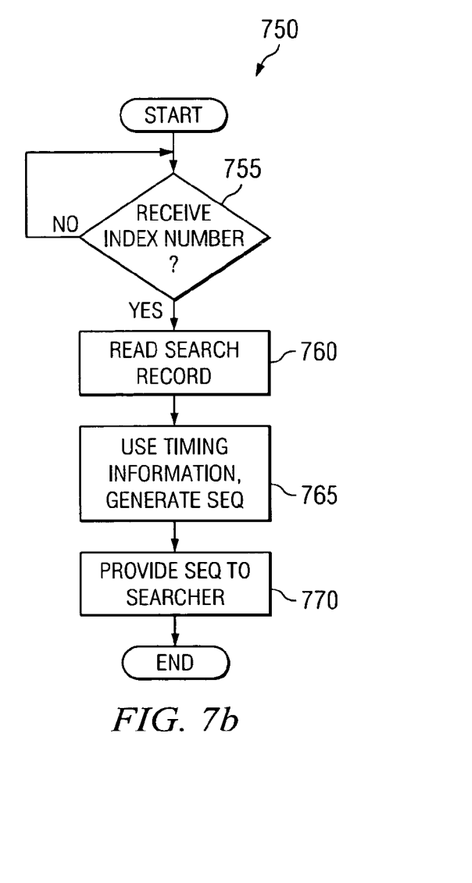

With reference now to FIG. 7b, there is shown a flow diagram illustrating a sequence of steps 750 that a sequence generator can undergo to generate a requested PN sequence, according to a preferred embodiment of the present invention. According to a preferred embodiment of the present invention, a sequence generator (such as the sequence generator 540 (FIG. 5)) may begin when receives an index number (block 755) from a search control unit (such as the search control unit 550 (FIG. 5)). Alternatively, the sequence generator 540 may be able to detect when there are search records that have not been processed.

After receiving an index number from the search control unit 550, the sequence generator 540 can use the index number to retrieve information relevant to the hypothesis that is stored in a search record (block 760). The sequence generator 540 then can use timing information (perhaps provided to it by a multi-mode searcher (such as the multi-mode searcher 515 (FIG. 5))) and begin generating a PN sequence corresponding to the hypothesis (block 765). After the sequence generator 540 completes the generation of the PN sequence, then the PN sequence can be provided to the multi-mode searcher 515.

Figure 8:
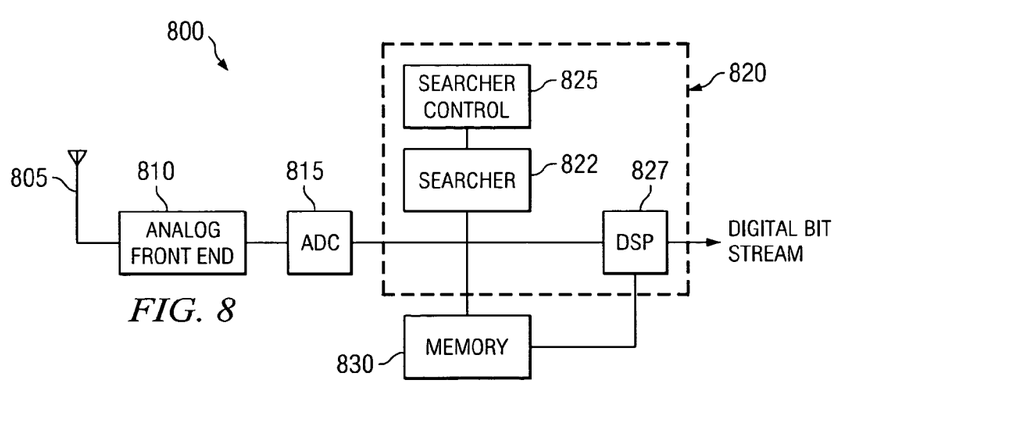
FIG. 8 is a diagram of a wireless device with a multi-mode searcher, according to a preferred embodiment of the present invention.

With reference now to FIG. 8, there is shown a block diagram illustrating a wireless receiver 800 with multi-mode searcher 822, according to a preferred embodiment of the present invention. The wireless receiver 800 includes an analog front end 810 which receives signals over-the-air by an antenna 805. The analog front end 810 may be sued to filter the received signal to help eliminate out-of-band noise and interference, equalize and amplify the received signal to bring the received signal to a power level that is suitable for processing, and so forth. An analog-to-digital converter (ADC) 815 converts the analog signal into its digital representation.

Digital symbols, produced by the ADC 815, may then be provided to a digital signal processing unit 820. The digital signal processing unit 820 can be responsible for functions such as error detecting and correcting of the digital symbols, decoding and despreading the symbol stream, deinterleaving and depuncturing the symbol stream, and so on. The digital signal processing unit 820 also include the multi-mode searcher 822 with its attendant searcher controller 825 to help the wireless receiver 800 become synchronized with base stations from multiple communications networks in rapid fashion and with minimum additional hardware. A digital signal processor (DSP) 827 or a generic processing element may be available to perform many of the tasks required of the digital signal processing unit 820 in software, including the task of synchronizing the wireless receiver 800 with different communications networks.

A memory 830 may be coupled to the digital signal processing unit 820 to provide storage, such as search hypotheses with relevant information. Alternatively, the memory 830 may be inside the digital signal processing unit 820 or there may be multiple memories, each coupled to different parts of the digital signal processing unit 820 to provide needed storage. Finally, a digital bit stream can be produced by the digital signal processing unit 820, intended for use by circuits and devices coupled to the wireless receiver 800. Examples of circuits and devices that may be coupled to the wireless receiver 800 may include audio and video circuitry, digital computers and personal digital assistants, multimedia devices, data and information networks, and so forth.

Although the present invention and its advantages have been described in detail, it should be understood that various changes, substitutions and alterations can be made herein without departing from the spirit and scope of the invention as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for detecting direct sequence spread spectrum signals with a searcher comprising:
   specifying a first hypothesis for a direct sequence spread spectrum signal from a Universal Mobile Telephony System (UMTS) compliant network;
   specifying a second hypothesis for a direct sequence spread spectrum signal from a Code-Division Multiple Access-2000 (CDMA2000) compliant network;
   generating a pseudo-random number (PN) sequence based on the hypothesis associated with a selected one of the Universal Mobile Telephony System (UMTS) compliant and Code-Division Multiple Access-2000 (CDMA2000) compliant communications networks;
   providing the PN sequence to the searcher to correlate with a received signal;
   adjusting the PN sequence to conform to the selected communications network; and
   correlating the adjusted PN sequence with the received signal.

2. The method of claim 1, further comprising after the using:
   accumulating the correlation results of the adjusted PN sequence with the received signal; and
   processing the accumulation result.

3. The method of claim 2, wherein the accumulating comprises coherent and non-coherent accumulation.

4. The method of claim 2, wherein the processing comprises:
   comparing the accumulation result with a specified threshold; and
   saving the accumulation result if it exceeds the specified threshold.

5. The method of claim 2 further comprising prior to the accumulating, despreading the received signal.

6. The method of claim 5, wherein the despreading removes an antenna diversity scheme.

7. The method of claim 1, wherein a hypothesis for the direct sequence spread spectrum signal from a UMTS compliant communications network may be different from a hypothesis for the direct sequence spread spectrum signal from a CDMA2000 compliant communications network.

8. The method of claim 1, wherein the adjusting comprises wrapping around the PN sequence when the specific communications network is a CDMA2000 compliant communications network.

9. The method of claim 1, wherein the generating is further based on a timing reference.

10. The method of claim 9, wherein the timing reference is provided by the searcher.

11. The method of claim 10, wherein the timing reference is provided by a capture time unit.

12. A circuit comprising:
a memory to store information relevant to hypotheses associated with at least two incompatible communications networks;
sequence generator coupled to the memory, the sequence generator containing circuitry to generate a pseudo-random number (PN) sequences based on one of the hypotheses;
a searcher coupled to the sequence generator, the searcher containing circuitry to correlate a PN sequence for a selected one of the communications networks generated by the sequence generator with a received signal and to accumulate results from the correlation; and
a search controller coupled to the memory, the search controller containing circuitry to configure and control the operation of the searcher.

13. The circuit of claim 12, wherein the hypotheses are indexed in the memory by a reference numbers and the information relevant to the hypotheses can be accessed by the reference numbers.

14. The circuit of claim 12, wherein the sequence generator uses one of the hypotheses and a timing reference provided by the searcher to generate the PN sequence.

15. The circuit of claim 12, wherein the memory can store information for multiple hypotheses simultaneously.

16. The circuit of claim 15, wherein information relevant to each hypothesis can be referenced through the use of a unique reference number.

17. The circuit of claim 12, wherein the searcher contains a PN sequence adjust unit wherein differences between PN sequences for different communications networks can be accommodated.

18. The circuit of claim 17, wherein an adjustment made by the PN sequence adjust unit comprises changing a wraparound point for a PN sequence for use in CDMA2000 compliant communications network.

19. The circuit of claim 12, wherein the searcher comprises a despreader coupling a sample processor to a coherent/non-coherent accumulator.

20. The circuit of claim 19, further comprising a result processor coupled to the coherent/non-coherent accumulator.

21. A wireless receiver comprising:
an analog front end coupled to an antenna, the analog front end containing circuitry to filter and amplify a received signal provided by the antenna;
an analog-to-digital converter (ADC), the ADC to convert an analog signal provided by the analog front end into a digital symbol stream; and
a digital signal processing section coupled to the ADC, the digital signal processing section containing circuitry to synchronize the wireless receiver with a communications network, comprising:
a memory to store information relevant to a hypotheses associated with at least two incompatible communications networks;
sequence generator coupled to the memory, the sequence generator containing circuitry to generate pseudo-random number (PN) sequences based on the hypotheses;
a searcher coupled to the sequence generator, the searcher containing circuitry to correlate a PN sequence for a selected one of the communications networks generated by the sequence generator with a received signal and to accumulate results from the correlation; and
a search controller coupled to the memory, the search controller containing circuitry to configure and control the operation of the searcher.

22. The wireless receiver of claim 21, wherein the hypotheses are indexed in the memory by reference numbers and the information relevant to the hypotheses can be accessed by the reference numbers.

23. The wireless receiver of claim 21, wherein the memory can store information for multiple hypotheses simultaneously.

24. The wireless receiver of claim 21, wherein the wireless receiver is part of a wireless device capable of operating in multiple communications networks.

25. The wireless receiver of claim 24, wherein the multiple communications networks are Universal Mobile Telephony System (UMTS) and CDMA2000 (Code-Division Multiple Access 2000) compliant communications networks.

26. The wireless receiver of claim 21, wherein the searcher comprises a despreader coupling a sample processor to a coherent/non-coherent accumulator.

27. The wireless receiver of claim 26, further comprising a result processor coupled to the coherent/non-coherent accumulator.

28. A method, comprising the steps of:
storing information relevant to hypotheses associated with at least two incompatible communications networks;
generating pseudo-random number (PN) sequences based on the hypotheses;
correlating a PN sequence for a selected one of the communications networks generated by a sequence generator with a received signal and accumulating results from the correlation; and
configuring and controlling the operation of a search controller coupled to a memory storing the relevant information.

29. A method, comprising the steps of:
providing an analog front end coupled to an antenna, the analog front end containing circuitry to filter and amplify a received signal provided by the antenna;
providing an analog-to-digital converter (ADC), the ADC to convert an analog signal provided by the analog front end into a digital symbol stream; and
providing a digital signal processing section coupled to the ADC, the digital signal processing section containing circuitry to synchronize the wireless receiver with a communications network, comprising:
providing a memory to store information relevant to hypotheses associated with at least two incompatible communications networks;
providing a sequence generator coupled to the memory, the sequence generator containing circuitry to generate pseudo-random number (PN) sequences based on the hypotheses;
providing a searcher coupled to the sequence generator, the searcher containing circuitry to correlate a PN sequence for a selected one of the communications networks generated by the sequence generator with a received signal and to accumulate results from the correlation; and providing a search controller coupled to the memory, the search controller containing circuitry to configure and control the operation of the searcher.

30. A method for detecting direct sequence spread spectrum signals with a searcher comprising:

specifying a first hypothesis for a direct sequence spread spectrum signal from a first communications network;

specifying a second hypothesis for a direct sequence spread spectrum signal from a second communications network;

generating a pseudo-random number (PN) sequence based on the hypothesis associated with a selected one of the first and second communications networks, wherein a PN sequence for the first communications network is of a length different than the length of a PN sequence for the second communications network;

providing the PN sequence to the searcher to correlate with a received signal;

adjusting the PN sequence to conform to the selected communications network; and correlating the adjusted PN sequence with the received signal.

31. The method of claim 30, wherein the first PN sequence uses a Gold code and the second PN sequence uses a Walsh code.

* * * * *